United States Patent [19]

Brueggemann et al.

[11] 4,230,394
[45] Oct. 28, 1980

[54] MIRROR FACET TRACKER USING SPHERICAL MIRRORS

[75] Inventors: Harry P. Brueggemann, San Marino; David A. Grafton, Santa Monica, both of Calif.

[73] Assignee: Xerox Corporation, Stamford, Conn.

[21] Appl. No.: 26,275

[22] Filed: Apr. 2, 1979

[51] Int. Cl.³ ............................................. G02B 27/17
[52] U.S. Cl. ........................................................ 350/6.8
[58] Field of Search ........................... 350/6.8, 6.7, 6.5

[56] References Cited
U.S. PATENT DOCUMENTS 3,910,675  10/1975  MacGovern .......................... 350/6.7

FOREIGN PATENT DOCUMENTS 487318  6/1938  United Kingdom ..................... 350/6.8

Primary Examiner—Jon W. Henry
Attorney, Agent, or Firm—Leonard Zalman

[57] ABSTRACT

An all mirror facet tracking system including first and second spherical mirrors. Both of the mirrors can be located along the same system axis on opposite sides of a rotating multi-faceted polygon which has its axis of rotation on the system axis. To reduce coma, the spherical mirrors are located along orthogonal system axes and a flat folding mirror is provided between the two spherical mirrors to reduce the angle of incidence of the chief ray with the second spherical mirror.

4 Claims, 2 Drawing Figures

MIRROR FACET TRACKER USING SPHERICAL MIRRORS

BACKGROUND OF THE INVENTION

Much attention has been given recently to flying spot scanners which impart the information content of a modulated laser beam to a scanned light sensitive medium. Conventional flying spot scanners employing a rotating multi-faceted polygon generally utilize one of two types of illumination procedures. In the first type, the laser beam is adjusted to have a smaller cross-sectional area than the cross-sectional area of the facets of the polygon. With such an arrangement (termed underfilled), all of the laser power is available for use during the scanning operation; however, a facet changeover problem exists because the beam cannot be effectively used during the time that a facet intersection is passing through the laser beam.

In the second type of scanner, the laser beam is made larger than the individual facets of the polygon and, in fact, is spread so as to cover at least two or three adjacent facets simultaneously. With this construction (termed overfilled), there is no facet changeover problem and a high duty cycle is obtainable. However, by spreading the laser beam to fill several facets, a considerable fraction of the potential laser power is not available for use, and this is unacceptable in many applications.

The disadvantages of the underfilled and overfilled flying spot scanners has led to the concept of facet tracking in which an appropriate shifting structure is used for causing the laser beam to follow the active deflecting facet as it moves such that the laser beam remains fully on the active deflecting facet for a period of time at least equal to the duration of the scan across the light sensitive medium. An exemplary facet tracking system of the prior art is disclosed in U.S. Pat. No. 3,910,657 in which a shearing means, associated with each of the deflector facets and positioned in the path of the laser beam in advance of the deflector, shears the laser beam to positions parallel to itself by amounts insufficient to maintain it fully on the deflector face for a substantial period of time. In one configuration of the aforementioned patent, the shearing means is comprised of a plurality of glass plates corresponding in number to the number of facets of the deflector and rotatable with the deflector to vary the amount of shear as the deflector rotates. The exemplary facet tracker is inherently mechanically unstable due to its use of multiple rotating members and hence not desirable for high speed, high resolution scanning. From the foregoing it is apparent that less complex facet tracking systems are desirable.

SUMMARY OF THE INVENTION

The present invention provides apparatus for increasing the reliability of laser scanning systems which utilize a multifaceted polygon as the scanner. Specifically, an all-mirror system including first and second spherical mirror is disclosed for tracking the active deflecting facet of a spinning polygon. In one embodiment of the invention, both of the spherical mirrors are located along the same system axis on opposite sides of the scanning polygon which has its axis of rotation on the system axis. In another embodiment of the invention which provides reduced coma relative to the first configuration, a flat folding mirror is disposed between the two spherical mirrors.

The all-mirror facet tracking system of the invention would be more useful for a color scanner than a system using refractive elements. In addition, an all-mirror system would be useful in other regions of the spectrum besides the visible, where transparent refractive materials may not be available.

BRIEF DESCRIPTION OF THE DRAWINGS

Specific embodiments of the invention are described in detail below with reference to the drawings for those embodiments, in which.

DETAILED DESCRIPTION OF THE INVENTION

The facet tracking system of this invention utilizes two spherical mirrors which correspond to the eyepiece and objective of a telescope, used in a reverse manner as compared to the usual telescope configuration. That is, the direction of the light through the system is from the eyepiece mirror to the objective mirror instead of the usual objective to eyepiece direction.

Figure 1:
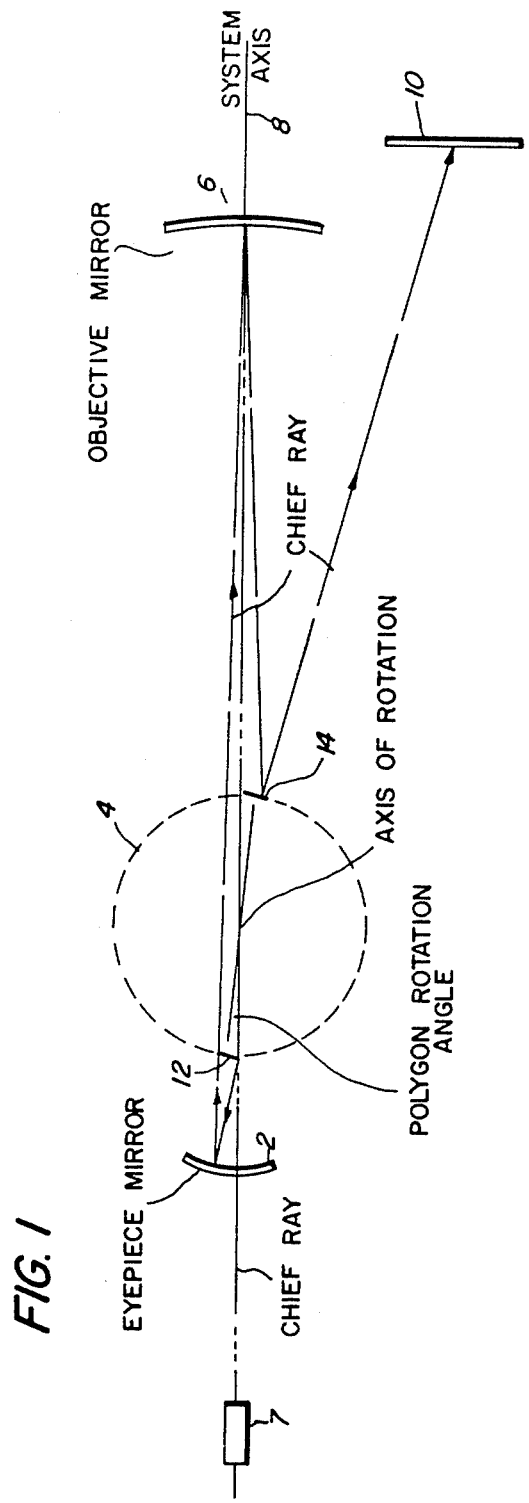
FIG. 1 is a view in the tangential plane of a flying spot facet tracking scanning system in accordance with one embodiment of the invention.

Referring now to FIG. 1, the facet tracking system includes an eyepiece spherical mirror 2 located on one side of a multi-faceted rotating polygon 4 and an objective-mirror 6 located on the opposite side of polygon 4. The center of curvature of each of the spherical mirrors 2 and 6 lies along the system axis 8 which corresponds to the initial direction of the central or chief ray of a bundle of rays from a laser source 7 which are eventually focused onto photosensitive surface 10. The axis of rotation of polygon 4 intersects the system axis. For simplicity of illustration, only a first facet 12 and a second facet 14 of the many facets of the polygon 4 are shown, it being understood that in addition to oppositely disposed facets 12 and 14 the polygon will have other facets evenly distributed about its entire circumference.

For reference purposes, a rotation angle is defined for polygon 4, which is zero when the polygon is oriented so that the center of each of the facets 12 and 14 is normal to the chief ray coming towards the first facet 12 on the left side of FIG. 1. When the polygon rotation angle is at the zero position, the chief ray is reflected from the first polygon facet 12 toward the eyepiece spherical mirror 2. Since the polygon facet 12 is normal to the chief ray, the chief ray is reflected back on itself; the chief ray is then reflected from the eyepiece spherical mirror 2 past the polygon 4 towards the objective spherical mirror 6. As noted, the centers of curvature of the two spherical mirrors are on the system axis 8, and thus the chief ray is normal to both spherical mirrors when the polygon rotation angle is zero. Then the chief ray is reflected back on itself from the objective spherical mirror toward the second polygon facet 14. Since, in the zero rotation position the second facet 14 is normal to the system axis 8 and also the chief ray, the chief ray is reflected back on itself from the second facet and toward the photosensitive surface. To avoid interference between the components of the system, each reflecting surface is tilted in the sagittal plane (the plane normal to the plane of the paper) with respect to the beam, that is, the beam is not normal to any reflecting surface in the sagittal plane.

Now, the polygon 4 is given some rotation angle, so that the facets thereof have not only rotated, but their centers have been translated from the system axis 8. Since the angle of reflection of the chief ray from the first facet 12 is dependent on the rotation angle of the polygon, the reflected chief ray will now make an angle to the system axis 8 which is twice the rotation angle as shown in FIG. 1 where a non-zero angle of polygon rotation is shown. From the first facet 12, the chief ray is at some nonzero angle to the system axis 8, and the chief ray strikes the spherical eyepiece mirror 2 at some distance from the system axis 8. The chief ray is now reflected from the mirror 2 toward the spherical objective mirror 6. The power of the eyepiece mirror 2, the distance between mirror 2 and facet 12, and the distance between the mirrors 2 and 6, are all chosen so that the chief ray strikes the mirror 6 at the pole of the mirror 6, that is, the chief ray strikes the mirror 6 at the point where the mirror 6 intersects the system axis 8. The normal to the objective mirror 6 at this point (the pole) is always along the system axis 8, no matter what the power of the objective mirror which can be chosen for considerations other than facet tracking.

The chief ray is now reflected from the pole of the mirror 6 towards the second polygon facet 14 which also has rotated from the system axis. The distance from the mirror 6 to the facet 14 is chosen so that the chief ray at the second facet 14 has moved from the system axis by an amount equal to the translation of the center of the second facet 14 from the system axis due to the polygon rotation angle. This is the facet tracking function, that is, the chief ray follows the active reflecting facet 14. The distance of the eyepiece mirror 2 from the first facet 12, plus the diameter of the polygon 4, plus the distance from the second facet to the objective mirror 6, must equal the distance between mirrors 2 and 6. This means that choosing the distance from the objective mirror 6 to the second facet 14 for facet tracking is not independent of choosing the other distances to keep the chief ray always at the pole of the objective mirror.

Conformity with the equations set forth below will ensure that the chief ray is always at the pole of the mirror 6 while the chief ray is tracking the active facet (facet 14 in the foregoing description). The equations are expressed as a function of a parameter M, where M is the ratio of the angle of the chief ray to the system axis before reflection from the eyepiece mirror 2, but after reflection from facet 12, to the angle of the chief ray to the system axis after reflection from the eyepiece mirror 2. In the equations, the distance $t_1$ is the distance from the first facet to the eyepiece mirror, $t_2$ is the distance from the eyepiece mirror to the objective mirror, $t_3$ is the distance from the objective mirror to the second facet, and $C_1$ is the curvature of the eyepiece mirror. Normalizing these parameters to the radius of the polygon $r_p$ (half the polygon diameter), the relationship between the foregoing parameters, for small angles, are:

$$\frac{t_1}{r_p} = \frac{M+4}{2(M+1)} ; \frac{t_2}{r_p} = \frac{M(M+4)}{2(M-1)} ; \frac{t_3}{r_p} = \frac{M}{2} ;$$

and $$C_1 r_p = \frac{M^2 - 1}{M(M+4)}$$

Choosing a value for M determines the other parameters.

In FIG. 1, only the chief ray is shown, the image points along the chief ray are not shown. If the laser beam is considered to be a collimated bundle at the first facet and at the eyepiece mirror, a focus will occur on the chief ray at a distance from the eyepiece mirror equal to the focal length of the eyepiece mirror. The power of the objective mirror is such that the collimated bundle is refocused at a desired position, that is, at the photosensitive surface 10 after the objective mirror.

In the system of FIG. 1, the angle of the chief ray to the objective mirror 6 at the pole of the objective mirror causes the aberration of coma to appear at the focus after the objective mirror. With the restriction that the chief ray must strike the objective mirror at its pole, coma cannot be significantly reduced for any value of M.

To reduce coma, the angle of incidence of the chief ray at the objective mirror must be reduced. In accordance with a second embodiment of the invention, the angle of incidence of the chief ray at the objective mirror is reduced while still tracking a polygon facet by causing the chief ray to be off the pole of the objective mirror. Specifically, a flat mirror is disposed between the eyepiece and objective mirrors, the introduction of the flat mirror requires that, in order to track a facet after reflection from the objective mirror, the chief ray move in the opposite direction from that shown in FIG. 1. This in turn forces the chief ray to be off the pole of the objective mirror, and reduces the angle of incidence of the chief ray at the objective mirror. The power of the objective mirror is now a factor in the facet tracking function.

Figure 2:
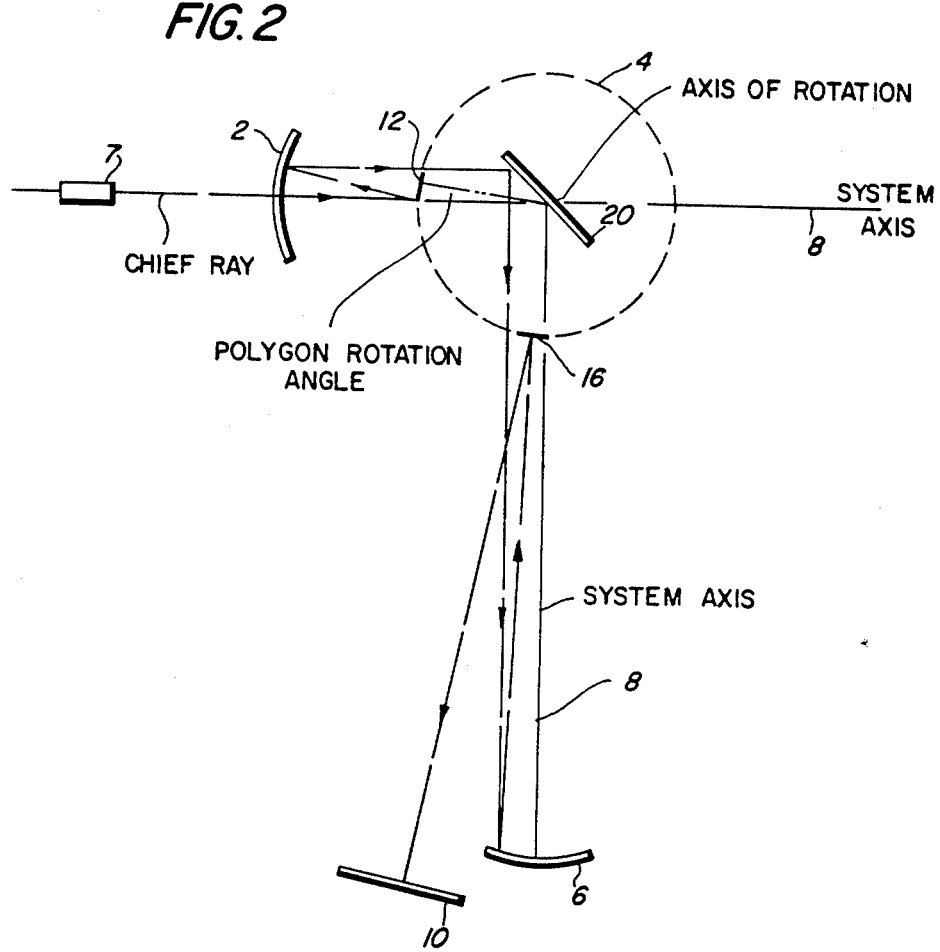
FIG. 2 is a view in the tangential plane of a flying spot facet tracking system in accordance with a second embodiment of the invention.

A facet tracking system with reduced coma is shown in FIG. 2 wherein components corresponding to like components of FIG. 1 are given the same reference numerals. As previously noted, this system includes a flat mirror 20 between the eyepiece mirror 2 and the objective mirror 6. Flat mirror 20 implies a folding of the system axis, and so that the light rays remain symmetrical about the system axis the plane of the flat mirror is made to pass through the axis of rotation of polygon 4. The folding angle is immaterial, so long as it causes the system axis to pass through the center of a facet of the polygon before and after the flat mirror, for a zero value of polygon rotation angle. In FIG. 2, the flat mirror 20 is at a forty five degree angle to the system axis, thus the system axis is folded through a ninety degree angle. This particular angle of folding requires that the number of facets on the polygon 4 be divisible by four, so that, at zero rotation angle of the polygon 4, the system axis passes through the center of one facet of the polygon before the flat mirror and through the center of another facet of the polygon after the flat mirror.

Referring again to FIG. 2, with a zero polygon rotation angle, the chief ray is coincident with a system axis throughout the system. With some polygon rotation angle, the chief ray, after reflection from the first polygon facet 12, makes an angle to the system axis equal to twice the rotation angle. After the chief ray is reflected from the eyepiece mirror 2, it is reflected by the flat mirror 20 and travels to the objective mirror 6, where it is reflected toward the second facet 16. Due to the folding action, the angle of incidence at the objective mirror 6 is small, and the coma caused by the objective mirror 6 is almost as small as the coma caused by the eyepiece mirror. Since the coma of the eyepiece and objective mirrors are of opposite sign, they tend to cancel each other, and the system coma at the final focus is very small.

As shown in FIG. 2, after reflection from the flat mirror, the chief ray strikes the center of the facet 16 without crossing the system axis. By reference to the embodiment of FIG. 1, it is seen that without the flat folding mirror, the chief ray would be moving in a direction opposite to that of the second facet 14, whereas, in the embodiment of FIG. 2 the flat mirror 20 reverses the direction of the chief ray and it tracks the center of the second facet 16.

The embodiment of FIG. 2 imposes two constraints upon the system. First, the distance from the eyepiece mirror to the first polygon facet, plus the polygon diameter, plus the distance from the second polygon facet to the objective mirror, must equal the optical distance between the eyepiece and the objective mirrors. Second, the chief ray must track the second facet. Equations are set forth below which define the relationships between parameters that satisfy the constraints set forth. The same notations are used in the second embodiment equations as was used in the first embodiment equations, with the addition of $C_2$ as the curvature of the objective mirror. The distance $t_2$, from the eyepiece mirror to the objective mirror, is defined as the distance from the eyepiece mirror to the flat mirror plus the distance from the flat mirror to the objective mirror. Since the equations are lengthy, intermediate parameters are defined as follows:

$$C_1 = \frac{M+1}{2t_2} \; ; \; P_2 = C_1 - MC_2 \; ; \; P_3 = 2r_p - t_2$$

Then:

$$t_1 = \frac{-[t_2(C_2 - C_1) + P_2 P_3] - \sqrt{[t_2(C_2 - C_1) + P_2 P_3]^2 - P_2[4 t_2(1 + C_2 P_3) - 5r_p]}}{2 p_2}$$

and $$t_3 = t_2 - t_1 - 2r_p$$

Values of M, $C_2$, $t_2$, and $r_p$ are chosen according to design requirements; interation through several values of the foregoing parameters may be necessary before an appropriate design is obtained.

A specific facet tracking design for the embodiment of the invention with reduced coma would be $r_p = 2.06849$ inches, $M = 11.4045$, $t_2 = 17.4633$ inches, and $C_2 = 0.0381438$ (inches)$^{-1}$. From those values the values of $C_1$, $P_2$ and $P_3$ are calculated to be $C_1 = 0.355159$ (inches)$^{-1}$, $P_2 = -0.079852$, and $P_3 = -13.32632$, and from those values the values $t_1$ and $t_3$ are calculated to be $t_1 = 1.31117$ inches and $t_3 = 12.0152$ inches. The distance $t_2$ is interrupted by the flat mirror at the polygon rotation axis, from the first spherical mirror 2 to the flat mirror 20 the distance is 3.3797 inches, and from the flat mirror 20 to the second spherical mirror 6 the distance is 14.0836 inches.

Each mirror is tilted in the sagittal plane with respect to the beam, that is, the beam is not normal to any mirror in the sagittal plane. The tilt angle need not be large, it can be between one-quarter and five degrees, depending on the spacing between the mirrors or other components. The asymmetry introduced by these tilted beams is small, and does not degrade the final focused beam at the photosensitive surface.

What is claimed is:

1. An all mirror system for tracking facets of a rotating, multi-faceted polygon, comprising a light source (7) for projecting a light beam along a system axis (8), a rotating polygon (4) having a plurality of facets (12, 14, 16) and having its axis of rotation intersecting the system axis (8), and a photosensitive surface (10) disposed off of the system axis (8) characterized in
    a first spherical mirror (2) disposed on one side of rotating polygon (4) and a second spherical mirror (6) disposed on a second side of rotating polygon (4), the centers of curvature of mirrors (2) and (6) being along a system axis (8), the distance between the second spherical mirror (6) and one of the facets (14) being chosen so that upon rotation of the one facet (14) from the system axis (8) the light beam moves from the system axis (8) by an amount equal to the amount of rotation of the one facet (14) from the system axis (8) such that the light beam follows the facet (14) and the light beam is swept across the photosensitive surface (10).

2. The system as claimed in claim 1, in which the light reflected from first spherical mirror (2) strikes the second spherical mirror (6) at the point where the second spherical mirror (6) intersects the system axis (8).

3. A system as claimed in claim 2, in which the centers of curvature of mirrors (2) and (6) are along the same system axis (8).

4. The system as claimed in claim 2, further including a flat mirror (20) disposed optically between mirrors (2) and (6), the plane of the flat mirror (20) passes through the axis of rotation of polygon (4), and the centers of curvature of mirrors (2) and (6) are along orthogonal system axes (8).

* * * * *